Patented Jan. 27, 1953

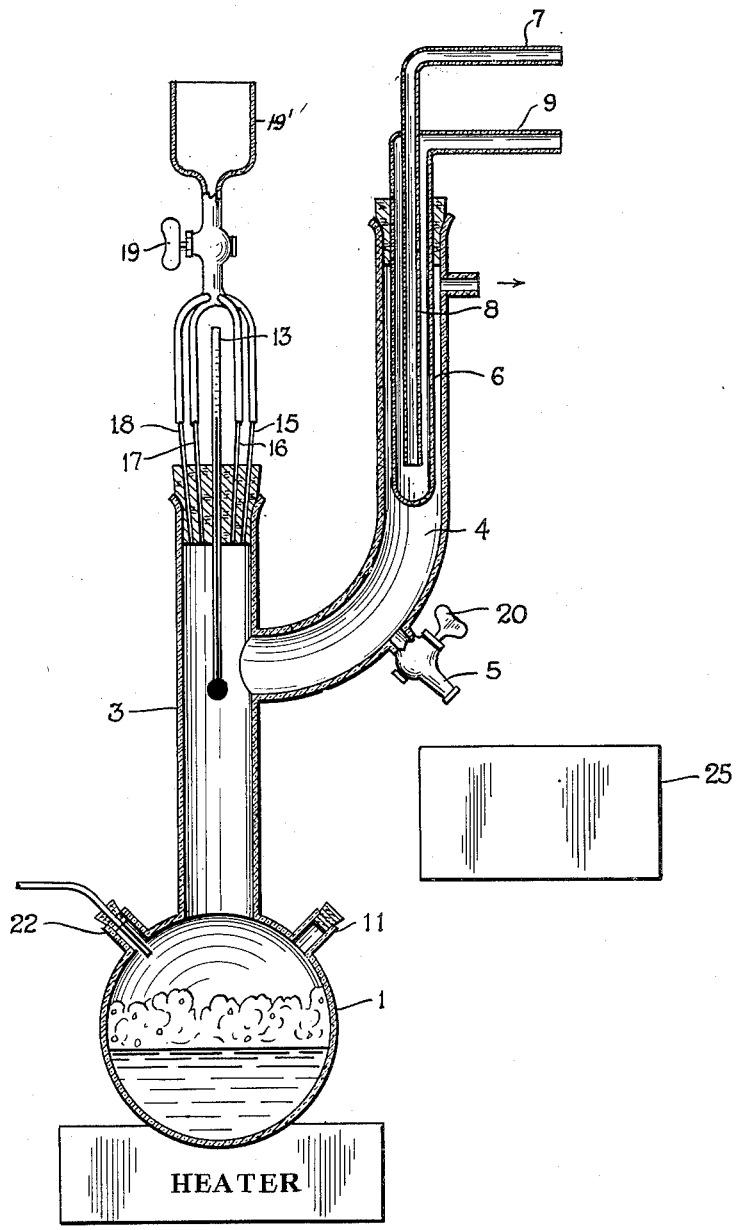

2,626,964

UNITED STATES PATENT OFFICE 2,626,964

PREPARATION OF 2,3-DICHLORO-1,3-BUTADIENE BY DEHYDROCHLORINATION OF 1,2,3,4-TETRACHLOROBUTANE

Kenneth C. Eberly, Akron, and Robert J. Reid, Canal Fulton, Ohio, assignors to The Firestone Tire & Rubber Company, Akron, Ohio, a corporation of Ohio Application December 22, 1948, Serial No. 66,646

2 Claims. (Cl. 260—655)

This invention relates to the preparation of 2,3-dichloro-1,3-butadiene by dehydrochlorination of 1,2,3,4-tetrachlorobutane.

1,2,3,4-tetrachlorobutane is generally prepared by the reaction of chlorine and butadiene:

$$CH_2{:}CH.CH{:}CH_2 + 2Cl_2 = CH_2Cl.CHCl.CHCl.CH_2Cl$$

There is obtained by this reaction about 80 to 90 per cent of solid 1,2,3,4-tetrachlorobutane and 20 to 10 per cent liquid 1,2,3,4-tetrachlorobutane. The solid isomer has a melting point of 72 to 73° C. and a boiling point of 102° C. at 22 mm. The liquid isomer has a melting point of −1° C.; boiling point, 94° C. at 22 mm.; $d_4^{20}$, 1.454; $n_D^{20}$, 1.5018. Either isomer or a mixture of the isomers may be used in the preparation of 2,3-dichloro-1,3-butadiene according to this invention.

It appears that on dehydrochlorination two trichlorobutenes are first produced, and by removal of further hydrogen chloride several dichlorobutadienes are obtained. According to this invention 2,3-dichloro-1,3-butadiene of high purity is obtained by repression of that type of dehydrochlorination which produces unwanted dichloro-1,3-butadienes.

The general reaction is illustrated diagrammatically below:

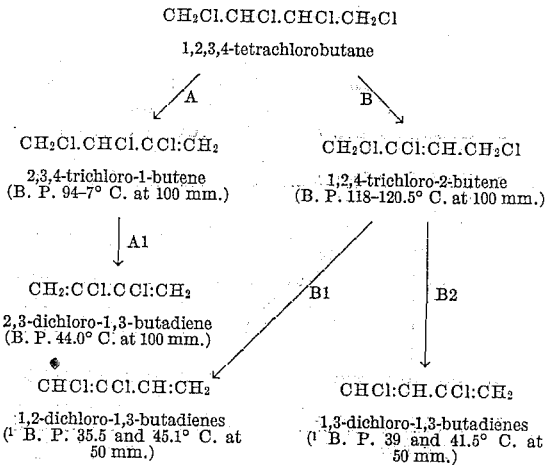

[1] There are two 1,2-dichloro-1,3-butadienes and two 1,3-dichloro-1,3-butadienes which will be distinguished herein by referring to them as high- and low-melting isomers. The boiling points of all the isomers are given. The 1,2,4-trichloro-2-butene is the high-density isomer and that is the only one referred to herein.

In the first phase of the dehydrochlorination one HCl is removed and trichlorobutenes are produced. There are two possible reactions indicated above by the letters A and B. There appears to be no way for forcing the action to follow the A route rather than the B route. The production of 1,2,4-trichloro-2-butene by the B route is unobjectionable because it boils at a much higher temperature than the desired 2,3-dichloro-1,3-butadiene and the two compounds can readily be separated by distillation. However, the 1,2- and 1,3-dichlorobutadienes obtained by the B route boil in the same general range as the desired 2,3-dichlorobutadiene and are difficult to separate, and their presence is therefore objectionable.

According to this invention the purity of the 2,3-dichloro-1,3-butadiene product is increased by repressing the dehydrochlorination of the 1,2,4-trichloro-2-butene. Such dehydrochlorination involves rearrangement of the olefinic linkage. Thus, according to this invention there is used a dehydrochlorination agent which selectively dehydrochlorinates without rearrangement of the olefinic linkage when in the presence of an olefin which cannot be dehydrochlorinated without such rearrangement. Stated another way, when added to a mixture of trichloro-1- and -2-butenes it dehydrochlorinates the 2,3,4-trichloro-1-butene. The final product contains undehydrochlorinated, high-density 1,2,4-trichloro-2-butene which can easily be separated from the 2,3-dichloro-1,3-butadiene, and only a small amount of the difficulty separable 1,2- and 1,3-dichloro-1,3-butadienes. Calcium hydroxide is the preferred reagent for such selective dehydrochlorination.

It is not to be supposed from the above discussion that the reaction progresses in distinctive stages, all of the tetrachlorobutane being first converted to trichlorobutenes, and then after this is completed all of the trichlorobutenes being converted to dichlorobutadienes. That is not the case. The two reactions go forward simultaneously. The same alkaline reagent is advantageously used to effect dehydrochlorination in both stages of the process.

The first dehydrochlorination step appears to produce but two trichlorobutenes, namely, 2,3,4-trichloro-1-butene and the high-density 1,2,4-trichloro-2-butene. The solid tetrachlorobutane isomer yields about nine parts of the former trichlorobutene to one part of the latter. The liquid isomer yields somewhat less of the former and somewhat more of the latter.

If calcium hydroxide is used as the dehydrochlorination agent a purer 2,3-dichloro-1,3-butadiene will be obtained than if sodium hydroxide is employed. Using either reagent, both tetrachlorobutanes are dehydrochlorinated to 2,3,4-trichloro-1-butene, and this is dehydrochlorinated to 2,3-dichloro-1,3-butadiene. Dehydrochlorination of either tetrachlorobutane simultaneously produces the 1,2,4-trichloro-2-butene. Lime attacks the 1,2,4-trichloro-2-butene less readily than it does 2,3,4-trichloro-1-butene, but sodium hydroxide attacks either with ease. 1,2,4-trichloro-2-butene which is left in the reaction mixture in large amount when lime is used is readily separated from the 2,3-dichlorobutadiene whereas the 1,2- and 1,3-dichlorobutadienes which result from the 1,2,4-trichloro-2-butene and are present in large amount when sodium hydroxide is used are not. Hence, when lime is used and the 1,2,4-trichloro-2-butene is attacked to only slight extent, purer 2,3-dichloro-1,3-butadiene is obtained.

The accompanying drawing shows more or less diagrammatically an elevation of equipment used for carrying out the process. The vessel 1 is a five-liter, three-necked flask. The flask is topped with a 30-cm. fractioning column 3 (38 mm. diameter). A side arm 4 at the top of the column is provided with a product outlet 5. The side arm is fitted with condenser 6 which presents a large cooling surface to gases and liquids which reach the end of this side arm. Cooling water supplied through inlet 7 flows through the inner tube 8 to the bottom of the condenser and then up through the condenser and is discharged through outlet 9. The fractionating column 3 is packed with broken glass tubing or the like. The opening 11 is for the introduction of tetrachlorobutane, dehydrochlorinating agent, and polymerization inhibitor to the flask. The fitting at the top of the column is provided with openings for thermometer 13 and four dripping tubes 15, 16, 17 and 18 which are fed with an inhibiting composition through the stopcock 19 from a reservoir 19'. The product outlet 5 provided with a valve 20 for opening and closing at will, serves for delivery of condensate. Nitrogen is slowly introduced to the flask through the side arm 22. The receiving flask 25 is provided under the valve 20. A polymerization inhibitor such as phenyl-beta-naphthylamine is advantageously placed in the receiver 25 to prevent polymerization of the product collected.

Water and dehydrochlorinating agent were introduced into the vessel through the opening 11. The water was introduced first and boiled to expel oxygen and then cooled. Air was expelled from the apparatus by means of nitrogen. Other inert gas might be used. Either aqueous sodium hydroxide or a slurry of calcium hydroxide was then introduced through the opening 11, together with the required amount of 1,2,3,4-tetrachlorobutane and polymerization inhibitor. Either solid or liquid tetrachlorobutane or any mixture of both may be used. It was found advantageous to disperse a small amount of wetting agent solution in the flask to increase the surface at which the reaction took place and thus speed up the reaction. The opening 11 was then closed, the flask was flushed well with nitrogen, and then slowly the contents were brought to a boil. The nitrogen flow was decreased to ½ cc. per second in order to reduce stack losses. The packing in the column 3 was kept wet with a slurry of phenyl-beta-naphthylamine (polymerization inhibitor) and wetting agent in water introduced through tubes 15 to 18.

A mixture of the desired 2,3-dichloro-1,3-butadiene and water boils at 79° C. The trichlorobutenes and tetrachlorobutanes in the presence of water boil at higher temperatures. Therefore, as the reaction mixture is heated to cause the reaction to go forward, the thermometer is watched. The 2,3-dichloro-1,3-butadiene, together with whatever small amount of other dichlorobutadienes are formed, rise to the top of the column as they are formed and displace the trichlorobutene vapor which in its turn has displaced the vapor of the higher boiling tetrachlorobutane. When sufficient dichlorobutadiene has been formed to fill the top of the apparatus down to the thermometer bulb, the temperature recorded by the thermometer will drop. When it has dropped to a temperature just above the boiling point of a constant-boiling mixture of water and the 2,3-dichloro-1,3-butadiene, e. g. 81–82° C., the valve 20 is opened and condensate is drawn off into the flask 25. As the temperature rises the valve 20 is closed, and the heating is continued, and the operation repeated as many times as necessary to complete dehydrochlorination of the tetrachlorobutane.

The following table records details of various runs:

| Run | A | B | C | D |
|---|---|---|---|---|
| $C_4H_6Cl_4$ Isomer | Solid | Solid | Liquid | Liquid. |
| Amount of above (grams) | 294 | 294 | 294 | 294. |
| Alkali Employed | NaOH | $Ca(OH)_2$ | $Ca(OH)_2$ | NaOH. |
| Amount Used (grams) | 168 | 210 | 210 | 180. |
| Water Used (cc.) | 1,500 | 1,700 | 1,700 | 1,620. |
| Inhibitor in Column (cc.) | 100 | 120 | 230 | 70. |
| Time Consumed (Hours) | 2.0 | 4.5 | 5.0 | 2.7. |
| Yield (Per Cent) | 62.3 | 56.9 | 40.7 | 53.2. |
| M. P. of Product (°C.), about | −50 | −36 | −36 | −42 to −50. |
| Other $C_4H_4Cl_2$ Present, per cent | 4.6 | 2.3 | 1.8 | 7.5. |
| Yield of $C_4H_5Cl_3$ (per cent) | 11.7 | 19.1 | 30.0 | 3.9. |

In each of the runs 18 grams of phenyl-beta-napthylamine was added to the reaction vessel in addition to that indicated in the foregoing table as added to the column through tubes 15 to 18. In Run A, 0.1 gram of a wetting agent, sodium dioctyl sulfosuccinate (Aerosol OT), was added to the vessel; in the other runs 0.2 gram was used. Other wetting agents may be employed. A small amount, less than 2 per cent of polymer formed in the vessel in each run. The trichlorobutenes tend to hydrolyze, and this caused a loss of up to 2 per cent in each run. The stack losses were considerable.

The relative purity of the 2,3-dichloro-1,3-butadiene obtained in the different runs is shown by the melting points. This product contained as impurity other dichlorobutadiene, mostly 1,2-dichloro-1,3-butadiene with some 1,3-dichloro-1,3-butadiene. The yield of trichlorobutene was almost entirely the undehydrochlorinated 1,2,4-trichloro-2-butene. Some dehydrochlorination of dichlorobutadienes occurred, but the products were chiefly gaseous and not recovered.

The organic distillate recovered in the vessel 25 was separated from the water, weighed, and distilled at a reduced pressure of 100 mm. or lower. Several runs were made and different equipment was used. The organic liquid usually started to boil in the neighborhood of 40° C. at 100 mm. The commercially pure 2,3-dichloro-1,3-butadiene (the amount and boiling point of which are recorded in the table) was collected at 42 to 45° C. at 100 mm.

Although the reaction is advantageously carried out by intermittent recovery of distillate, as described, other methods may be used. The refluxing temperatures may be varied by maintenance of an artificial pressure. Other polymerization inhibitors may be used, such as diphenylamine, etc. The lime need not be used as slurry, but dispersion leads to more rapid reaction and is recommended for commercial operation.

The terms "butane" and "butene" are used herein to refer to n-butane and n-butene.

What we claim is:

1. The process of producing 2,3-dichloro-1,3-butadiene which comprises refluxing a 1,2,3,4-tetrachlorobutane in admixture with aqueous lime slurry until the temperature of a partially segregated zone of the vapors closely approaches 81° C. and collecting condensate formed at this temperature while continuing the refluxing.

2. The process of producing 2,3-dichloro-1,3-butadiene which comprises refluxing a 1,2,3,4-tetrachlorobutane in admixture with lime slurry until the temperature of a partially segregated zone of the vapors closely approaches 81° C., collecting condensate formed at this temperature while continuing the refluxing, thereby causing the temperature of the vapors in this zone to rise, then without withdrawing condensate continuing the refluxing until the temperature of the vapors in this zone again closely approaches 81° C., and then again drawing off condensate and repeating the cycle.

KENNETH C. EBERLY.
ROBERT J. REID.

REFERENCES CITED

The following references are of record in the file of this patent:

UNITED STATES PATENTS

| Number | Name | Date |
| --- | --- | --- |
| 1,397,134 | McMillan | Nov. 15, 1921 |
| 1,998,442 | Carothers et al. | Apr. 23, 1935 |
| 2,445,738 | Willert | July 20, 1948 |

FOREIGN PATENTS

| Number | Country | Date |
| --- | --- | --- |
| 171,900 | Germany | June 18, 1906 |